United States Patent [19]

Frye

[11] Patent Number: 4,484,060

[45] Date of Patent: Nov. 20, 1984

[54] GAS-TUNGSTEN ARC WELDING OF ALUMINUM ALLOYS

[75] Inventor: Lowell D. Frye, Kingston, Tenn.

[73] Assignee: The United States of America as represented by the United States Department of Energy, Washington, D.C.

[21] Appl. No.: 361,932

[22] Filed: Mar. 25, 1982

[51] Int. Cl.$^3$ .............................................. B23K 9/00
[52] U.S. Cl. ................................ 219/137 R; 219/118
[58] Field of Search .............. 219/78.01, 78.02, 78.13, 219/78.14, 117.1, 118, 137 R, 72, 74

[56] References Cited

U.S. PATENT DOCUMENTS 3,597,832  8/1971  Colton et al. ...................... 29/470.3
4,163,516  8/1979  Burkhart et al. .................... 228/114

FOREIGN PATENT DOCUMENTS 795909  1/1971  U.S.S.R. ............................. 29/90 R

OTHER PUBLICATIONS

NASA Technical Brief B73-10481, "Welding of High Strength Aluminum Alloys" (1973).
Cary, Howard B., *Modern Welding Technology* (1979), pp. 482-483.

*Primary Examiner*—C. L. Albritton
*Assistant Examiner*—Catherine M. Sigda
*Attorney, Agent, or Firm*—Earl L. Larcher; Stephen D. Hamel; Michael F. Esposito

[57] ABSTRACT

A gas-tungsten arc welding method for joining together structures formed of aluminum alloy with these structures disposed contiguously to a heat-damagable substrate of a metal dissimilar to the aluminum alloy. The method of the present invention is practiced by diamond machining the fay surfaces of the aluminum alloy structures to provide a mirror finish thereon having a surface roughness in the order of about one microinch. The fay surfaces are aligned and heated sufficiently by the tungsten electrode to fuse the aluminum alloy contiguous to the fay surfaces to effect the weld joint. The heat input used to provide an oxide-free weld is significantly less than that required if the fay surfaces were prepared by using conventional chemical and mechanical practices.

4 Claims, 3 Drawing Figures

GAS-TUNGSTEN ARC WELDING OF ALUMINUM ALLOYS

This invention was made as a result of a contract with the U.S. Department of Energy.

BACKGROUND OF THE INVENTION

The present invention relates generally to the welding of aluminum alloys by gas tungsten arc welding procedures and more particularly to the welding of such alloys when utilized as an overlay on metals damagable by the heat normally employed in the tungsten arc welding process.

Gas tungsten arc welding has been successfully utilized for welding various metals for a considerable period of time. In practicing the gas tungsten arc welding process, juxtaposed edges of the metal structures to be welded are placed together and the heat produced by the arc formed between a nonconsumable tungsten electrode and the abutting or fay surfaces of the metal structure causes the metal to melt or fuse to effect the weld joint. The weld zone, the fused metal and the arc are protected during the welding operation from contaminants in the atmosphere by effecting the welding operation in an inert gas environment. Normally, the welding temperatures employed in the gas-tungsten arc welding process are in a range of about 9,000° to 12,000° F.

Gas-tungsten arc welding processes have been used successfully for the welding of aluminum alloys especially structural aluminum alloys containing magnesium such as in the 5000 and 6000 series. For example, such welding processes are described in detail in the NASA Technical Brief B73-10481 entitled, "Welding High-Strength Aluminum Alloys", published Apr. 1974. In this publication, a considerable discussion is directed to the preparation of the aluminum alloys for welding as well as the various welding parameters used with gas-tungsten arc welding techniques. Inasmuch as the various alloys and the gas tungsten arc welding techniques discussed and utilized in this publication are relevant to the practice of the present invention this publication is incorporated herein by reference.

The techniques described in the aforementioned publication for the gas-tungsten arc welding of aluminum alloys provide full penetration welds which exhibit sufficient integrity for satisfactory use in many applications. Normally, the oxide layers on the fay surfaces are dislodged and float out of the weld at the high temperatures used during the welding process so as to minimize the porosity of the weld. However, in instances where the aluminum alloy is used as an overlay for protecting an underlying substrate formed of metal such as stainless steel, low-carbon steel or various cladding materials as used in reactor applications, from corrosive and other environmental conditions damaging to the substrate material, the practice of the gas tungsten arc welding processes as discussed in the aforementioned publication have not been particularly satisfactory. For example, in order to provide a successful weld of the aluminum alloy, sufficient heat must be utilized to dislodge the oxide layers on the fay surfaces to assure that no oxide inclusions or porosity due to the oxide is present in the weld joint. However, with the aluminum alloy disposed in an abutting or contiguous relationship with a substrate formed of stainless steel, low-carbon steel, or cladding materials for nuclear fuel elements, adequate heat cannot be applied from the arc to effect the dislodging of the oxides present on the fay surfaces as previously prepared without deleteriously damaging the substrate. Further, the application of sufficient heat to effect the dislodging of these oxides will not only damage the underlying substrate metal but will tend to pull some of the substrate metal into the weld joint so as to form undesirable inclusions of the substrate metal in the weld.

Inasmuch as the presence of the naturally occurring oxide layer on the fay surfaces of the aluminum alloy primarily responsible for the porosity in the weld and necessitated the requirement of the high heat input for the dislodging of the oxide layer, efforts were investigated for removing the oxide layer so that a lower heat input value may be utilized to successfully weld the aluminum alloy without thermally damaging the underlying substrate. The thickness of the oxide layer is directly proportional to the surface area on the fay surfaces. Conventional chemical and mechanical surface preparing and cleaning techniques such as described in the aforementioned publication were utilized for preparing the fay surfaces but it was found that these techniques did not sufficiently deplete the oxide layer so as to provide for a successful weld at the relatively low heat input values which would not damage the underlying substrate. FIG. 2 of the accompanying drawings is illustrative of such a weld where the heat input applied during a gas-tungsten arc welding operation is insufficient to deplete the oxides stringers in the weld joint when the fay surfaces were prepared by immersion in a warm solution of 72 vol. % phosphoric acid, 24 vol. % water and 4 vol. % nitric acid for 3 minutes and then rinsing in water.

SUMMARY OF THE INVENTION

Accordingly, it is the primary aim or objective of the present invention to provide a gas-tungsten arc welding method for joining together juxtaposed portions of an aluminum alloy overlay disposed in a contacting relationship with a metal substrate subject to damage by the heat input which would be required to provide an oxide-free weld if the concentration of the oxide layers on the fay surfaces were within the range remaining after employing previously known mechanical or chemical surface preparation techniques. Generally, the present invention provides full penetration oxide-free welds through the aluminum alloy without deleteriously effecting the contiguously disposed substrate by diamond machining the fay surfaces to a mirror finish in which the surface roughness is in the range of about one microinch or less. The mirror-finished fay surfaces are juxtaposed and a force exerted for urging the fay surfaces together while heat input from the gas-tungsten arc is applied at a relatively low value to effect the weld. The diamond machining of the fay surfaces to within about a one microinch tolerance provides a surface having minimal surface area so that the oxide layer naturally occurring thereon is less than about 30 angstroms in thickness. The diamond machining also provides a surface essentially free of cavities or roughness which would normally contain contaminants detrimental to the weld. By providing the fay surfaces with the mirror finish the resulting surface area is considerably less than the surface areas remaining after employing known surface preparation techniques so that the oxide concentration is proportionally less. With this reduction in oxide concentration less heat input is required to effect the removal of the oxides from the weld joint.

Other and further objects of the invention will be obvious upon an understanding of the illustrative method about to be described or will be indicated in the appended claims, and various advantages not referred to herein will occur to one skilled in the art upon employment of the invention in practice.

A preferred pre-weld configuration of the fay surfaces has been chosen for the purpose of illustration and description. The configuration illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

DETAILED DESCRIPTION OF THE INVENTION

The invention is directed to a method for gas-tungsten arc welding of contiguous portions of an aluminum alloy overlay disposed in the contacting relationship with a substrate formed of a metal dissimilar to the aluminum alloy. The method of the invention is practiced by the steps of providing fay surfaces of the aluminum alloy overlay portions with a diamond machined surface finish having a surface roughness in the order of about one microinch or less. A load of about 200 to 300 psi is placed on one or both of the portions for urging the fay surfaces together and then the tungsten arc is initiated to provide an adequate heat input at the fay surfaces to effect a full penetration weld. The weld joint exhibits essentially no oxide inclusions or porosity between the portions. The heat input used is inadequate to effect thermal damage to the substrate or for forming inclusions of the substrate metal within the weld.

Figure 1:
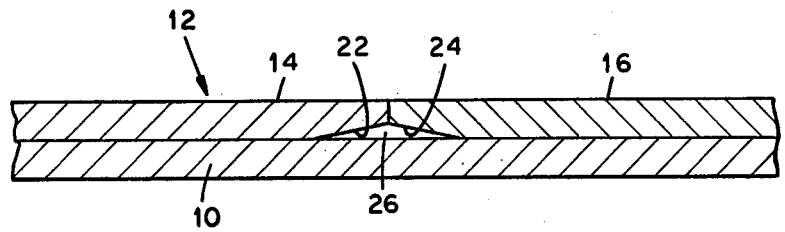
FIG. 1 is a schematic sectional drawing of a substrate provided with an aluminum alloy overlay that has surface portions thereof finished in accordance with the process of the present invention for effecting a full penetration, oxide-free weld by gas tungsten arc welding without deleteriously heating the substrate.

As generally shown in FIG. 1, a substrate 10 of stainless steel, low-carbon steel or any other metal that is subject to chemical or enviromental attacks and which can be protected by an aluminum alloy overlay 12 is provided with such an overlay of any suitable alloy series, preferably an alloy in the 5000 and 6000 series because of the corrosion resistance and durability of the alloys in these series. The overlay 12 may be pressed fit or otherwise placed against the substrate and may be of the thickness in the range of about 0.025 to 0.25 inch. As shown, the overlay 12 is formed of two portions 14 and 16 with these portions being joined by a butt weld which is provided by the juxtaposed positioning of the fay surface on portion 14 against a corresponding fay surface on portion 16 and then welding these end surfaces together by gas tungsten arc welding. In order to practice the present invention, the fay surfaces of both portions 14 and 16 are diamond machined to a mirror finish having a surface roughness in the order of 1 microinch or less. By diamond machining the surfaces, minimal peaks and valleys are present so as to have the least surface area available for aluminum oxide build-up and bridging. A uniformly thick layer of aluminum oxide of a thickness of about 5 to 30 angstroms will form on each machined surface. The diamond machining of the fay surfaces assures that when they are brought together the fay surfaces bare against each other in an essentially uniform manner throughout their entire contactable area so as to facilitate the welding operation.

Figure 3:
FIG. 3 is a cross-sectional view showing an oxide-free weld joint in which diamond machined fay surfaces were used in the gas-tungsten arc welding operation where the heat input was at essentially the same level as that used in forming the weld joint of FIG. 2.

In addition to the diamond machining of the fay surfaces, each section 14 and 16 of the overlay at the fay surfaces is provided with a chamfer such as generally shown at 22 and 24. The chamfer is at an angle of about 25° to 35° and is preferably surface-finished by diamond machining so as to provide minimal surface area for oxide formation as well as providing a surface with essentially no cavities or rough areas wherein debris and other contaminants such as lubricants or the like may be lodged. With the fay surfaces placed in an abutting relationship and the welding initiated by the tungsten arc, the molten weld metal penetrates into the volume or void formed by the chamfer to create a stirring action which increases the displacement of the oxides to the surface of the overlay where they are removed from the weld joint. As shown in FIG. 3, a weld provided by the present invention shows the chamfered volume 26 filled with weld metal and a full penetration weld joint is provided with no oxide inclusions or porosity.

The heat input from the tungsten arc required for fusing the aluminum alloy contiguous to the fay surfaces to provide an oxide-free weld joint is considerably less than that required for the welding of an aluminum alloy which has not been diamond machined due to the presence of the excessively thick oxide layer on the fay surfaces.

In a typical application of the present invention, strips of aluminum alloy with a thickness of approximately 0.049 inch was prepared by diamond machining the fay surfaces to a mirror fininsh with a surface roughness in the order of about 1 microinch. The diamond machine strips were placed atop of a sheet of stainless steel substrate for this welding operation. The strips were forced together with a load in the range of about 250 psi to assure that as the weld metal melts no gaps will appear at the weld joint. The weld was then formed with a maximum heat input of about 6750 joules of energy per linear inch of weld. Examination of the weld joint indicated that the weld fully penetrated the thickness of the aluminum strips. Essentially no porosity was detected in the fused joint and the stainless steel was not overheated or otherwise damaged by the welding operation. Further, there was no evidence of any constituents of the stainless steel drawn into the weld joint.

A similar oxide-free weld joint between aluminum alloy strips prepared by using known cleaning techniques would require a considerably greater amount of heat input, approximately 9000 joules of energy per linear inch of weld. With this quantity of heat input, the stainless steel substrate would be damaged by the heat so as to considerably detract from the usefulness of the welding operation.

Figure 2:
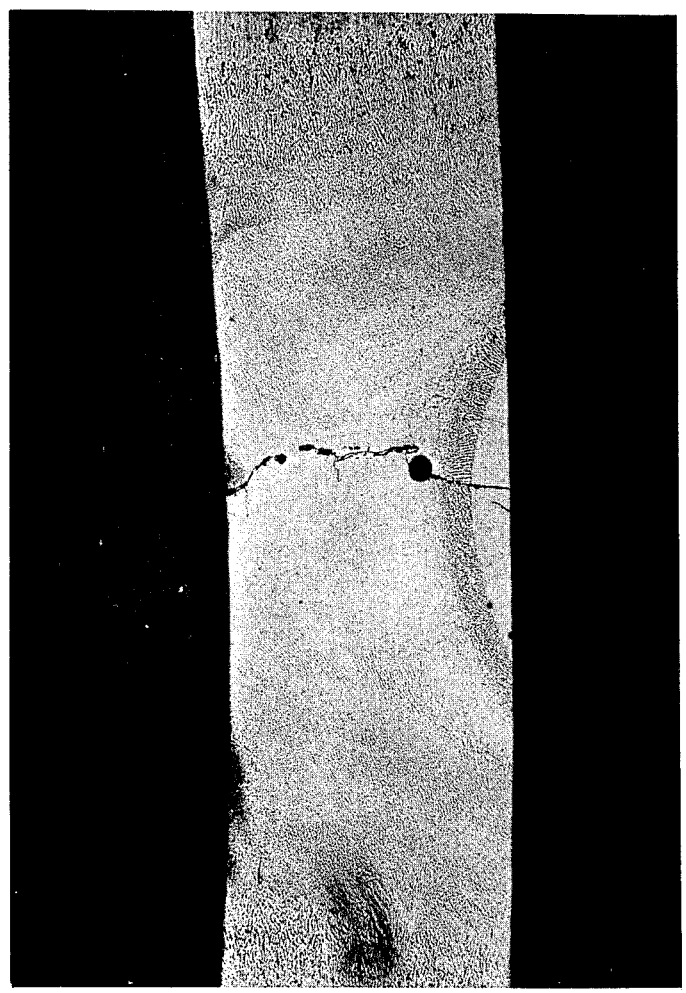
FIG. 2 is a cross-sectional view showing oxide inclusions in a gas-tungsten arc weld of the aluminum alloy that would be encountered by practicing the conventional surface cleaning processes.

In practicing the gas-tungsten arc welding process or method of the present invention, it may be desirable to pulse the arc several pulses per second by cycling the current input from about 90 amperes to about 50 amperes. With this pulsing the weld metal incrementally freezes during the welding operation to facilitate the formation of the weld joint. The lines present in the weld joint from the pulsing steps are illustrated in FIGS. 2 and 3.

It will be seen that the present invention provides a method for gas-tungsten arc welding of aluminum alloys by using less heat input than previously required for providing oxide-free welds.

What is claimed is:

1. A method for gas-tungsten arc welding of contiguous portions on an aluminum alloy overlay disposed in a contacting relationship with a substrate formed of a metal dissimlar to the aluminum alloy comprising the steps of:

providing fay surfaces of the overlay portions with a diamond machined surface finish having a surface roughness in the order of about 1 microinch; placing a load on at least one of the portions for urging the fay surfaces together; and providing heat input at the fay surfaces with the tungsten arc at a value adequate to effect a full penetration weld exhibiting essentially no oxide inclusions and no porosity between said portions with said value of heat input being less than that which would effect thermal damage to the substrate or form inclusions of the substrate metal in the weld.

2. The method of claim 1 including the additional step of providing a chamfer with a surface finish corresponding to that of the fay surfaces on each portion of the aluminum alloy overylay, wherein the chamfer on each portion is in registry with the fay surface to provide a volume between the overlay and the substrate at a location underlying the fay surfaces, and wherein the heat input at the fay surface is sufficient to fill the volume with weld metal.

3. The method of claim 1, wherein an aluminum oxide layer on each fay surface occurring after the diamond machining is of an essentially uniform thickness up to about 30 angstroms.

4. The method of claim 3, wherein the aluminum alloy is of a thickness in the range of about 0.025–0.25 inch, and wherein the maximum current input is about 90 amperes.

* * * * *